US012800846B2

(12) United States Patent
Yakabe et al.

(10) Patent No.: US 12,800,846 B2
(45) Date of Patent: Nov. 17, 2026

(54) OPTICAL CONNECTOR, METHOD FOR MANUFACTURING OPTICAL CONNECTOR, AND OPTICAL CONNECTION STRUCTURE

(71) Applicant: SUMITOMO ELECTRIC INDUSTRIES, LTD., Osaka (JP)

(72) Inventors: Sho Yakabe, Osaka (JP); Takako Sashida, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 277 days.

(21) Appl. No.: 18/384,938

(22) Filed: Oct. 30, 2023

(65) Prior Publication Data

US 2024/0142713 A1 May 2, 2024

(30) Foreign Application Priority Data

Nov. 2, 2022 (JP) ................................ 2022-176564

(51) Int. Cl.
*G02B 6/38* (2006.01)

(52) U.S. Cl.
CPC ......... *G02B 6/3825* (2013.01); *G02B 6/3847* (2013.01)

(58) Field of Classification Search
None
See application file for complete search history.

(56) References Cited

U.S. PATENT DOCUMENTS 10,444,439 B2 10/2019 Arao et al.
10,481,340 B2 * 11/2019 Yakabe ................ G02B 6/3822
11,048,050 B2 6/2021 Yakabe
2012/0201494 A1 8/2012 Suzuki
2014/0193120 A1 * 7/2014 Hodge ..................... G02B 6/32 385/79
2018/0321446 A1 11/2018 Arao et al.
2019/0049668 A1 * 2/2019 Yakabe ................ G02B 6/3818
2019/0154927 A1 * 5/2019 Shimakawa ........... G02B 6/403
2021/0141165 A1 * 5/2021 Guo ..................... G02B 6/3845
2022/0075120 A1 * 3/2022 Hirabayashi ........... G02B 6/262
2022/0137303 A1 * 5/2022 Otomitsu ............. G02B 6/3818 385/78
2022/0269011 A1 8/2022 Jian

FOREIGN PATENT DOCUMENTS

JP S5688217 U 7/1981
JP 2014-004752 A 1/2014
JP 2022-084620 A 6/2022
WO 2017/073408 A1 5/2017

* cited by examiner

*Primary Examiner* — Jerry Rahll
(74) *Attorney, Agent, or Firm* — Oliff PLC

(57) ABSTRACT

An optical connector includes at least one optical fiber, a ferrule, a spacer, and a protective film. The ferrule includes a ferrule end surface. The ferrule holds the optical fiber so as to expose a tip surface of the optical fiber at the ferrule end surface. The spacer is provided on the ferrule end surface. The spacer surrounds an exposed region of the ferrule end surface where the tip surface of the optical fiber is exposed. The protective film is configured to protect the spacer. The protective film covers the tip surface of the optical fiber. The protective film is provided so as to cover at least a part of a boundary between the exposed region of the ferrule end surface and a surface of the spacer when viewed from a direction orthogonal to the ferrule end surface.

9 Claims, 8 Drawing Sheets

OPTICAL CONNECTOR, METHOD FOR MANUFACTURING OPTICAL CONNECTOR, AND OPTICAL CONNECTION STRUCTURE

CROSS REFERENCE

The present application claims the benefit of priority from Japanese Patent Application No. 2022-176564, filed on Nov. 2, 2022, the entire content of which is incorporated herein by reference.

TECHNICAL FIELD

The present disclosure relates to an optical connector, a method for manufacturing an optical connector, and an optical connection structure.

BACKGROUND

WO 2017/073408A1 discloses an optical connector comprising an optical fiber, a ferrule holding the optical fiber, and a spacer adhering to an ferrule end surface. In this optical connector, the spacer has an opening configured to allow an optical path extending from a tip surface of the optical fiber to pass therethrough, and defines a clearance with respect to another optical connector.

SUMMARY

The present disclosure provides, as one aspect, an optical connector. The optical connector includes at least one optical fiber, a ferrule, a spacer, and a protective film. The ferrule includes a ferrule end surface. The ferrule holds the optical fiber so as to expose a tip surface of the optical fiber at the ferrule end surface. The spacer is provided on the ferrule end surface. The spacer surrounds an exposed region where the tip surface of the optical fiber is exposed in the ferrule end surface. The protective film is configured to protect the spacer. The protective film covers the tip surface of the optical fiber. The protective film is provided so as to cover at least a part of a boundary between the exposed region of the ferrule end surface and a surface of the spacer when viewed from a direction orthogonal to the ferrule end surface.

DETAILED DESCRIPTION

Figure 1:
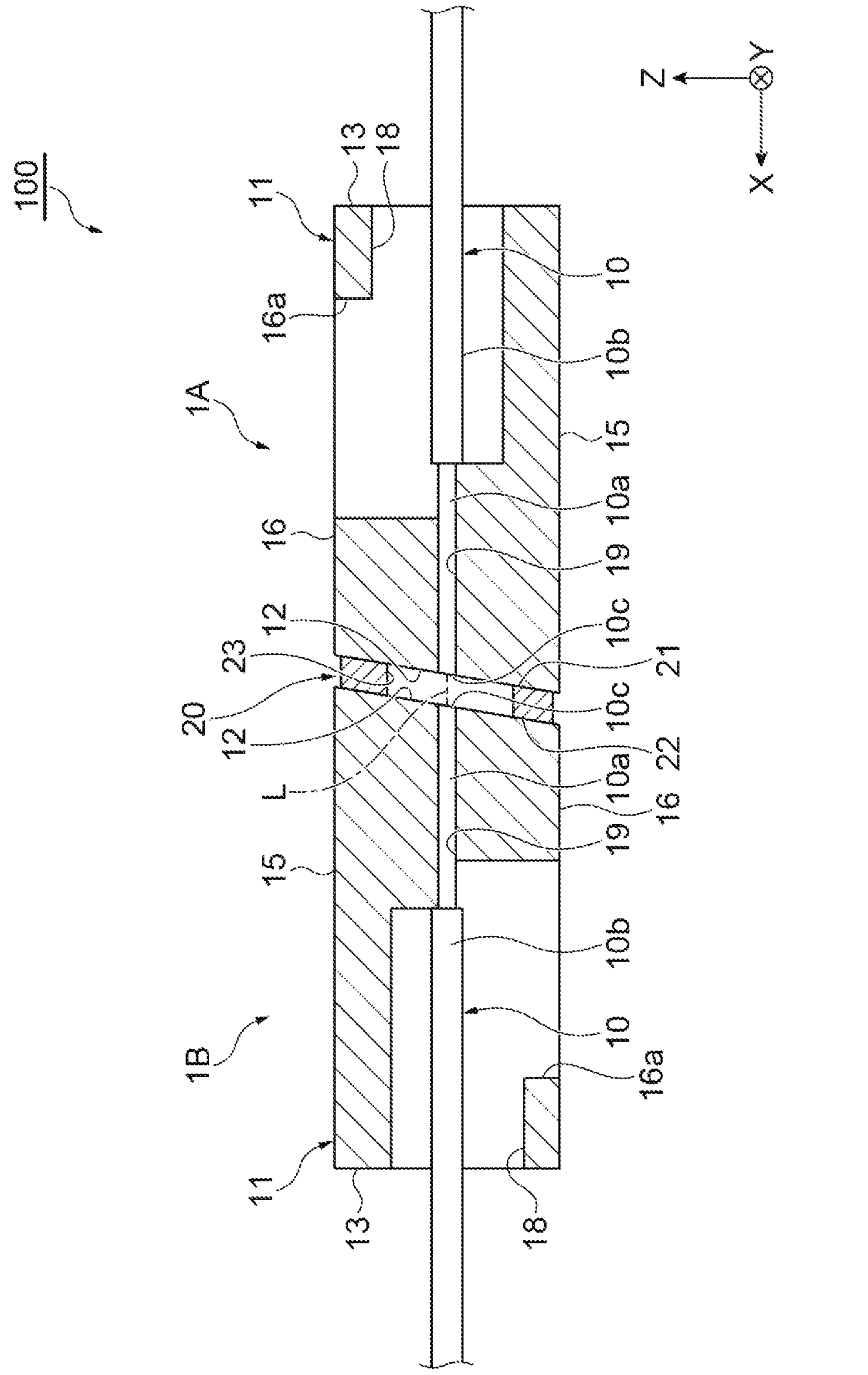
FIG. 1 is a cross-sectional view illustrating an example of a configuration of an optical connection structure according to an embodiment.

Problems to be Solved by the Present Disclosure

When an optical connector with a spacer described in WO 2017/073408A1 is connected to another optical connector, a cleaner such as cloth is slid in a state of being strongly pressed against a ferrule end surface prior to the connection, thereby cleaning a tip surface of an optical fiber exposed from the ferrule end surface. This makes it possible to prevent optical connection loss caused by adhesion of foreign matter onto the tip surface of the optical fiber. However, the above optical connector has a configuration in which a frame-shaped spacer made of a thin film adheres to the ferrule end surface, and the tip surface of the optical fiber is cleaned in a narrow region on the inner side of the spacer. Therefore, when the tip surface of the optical fiber is cleaned, the cleaner sometimes comes into contact with the spacer located around the region where the tip surface of the optical fiber is exposed so that the spacer is peeled off from the ferrule end surface.

Effects of Present Disclosure

According to the present disclosure, it is possible to prevent a spacer provided on a ferrule end surface from being peeled off from the ferrule end surface.

DESCRIPTION OF EMBODIMENTS OF PRESENT DISCLOSURE

First, contents of embodiments of the present disclosure will be listed and described.

[1] An optical connector according to an embodiment of the present disclosure includes at least one optical fiber, a ferrule, a spacer, and a protective film. The ferrule includes a ferrule end surface. The ferrule holds the optical fiber so as to expose a tip surface of the optical fiber at the ferrule end surface. The spacer is provided on the ferrule end surface. The spacer surrounds an exposed region where the tip surface of the optical fiber is exposed in the ferrule end surface. The protective film is configured to protect the spacer. In this optical connector, the protective film covers the tip surface of the optical fiber. The protective film is provided so as to cover at least a part of a boundary between the exposed region of the ferrule end surface and a surface of the spacer when viewed from a direction orthogonal to the ferrule end surface.

In this optical connector, the protective film is provided so as to cover at least a part of the boundary between the exposed region of the ferrule end surface where the tip surface of the optical fiber is exposed and the surface of the spacer. Thus, when the tip surface of the optical fiber is cleaned, it is possible to prevent a cleaner, pressed against the ferrule end surface, from coining into contact with the boundary between the exposed region of the ferrule end surface and the surface of the spacer. As a result, it is possible to prevent the spacer provided on the ferrule end surface from being peeled off from the ferrule end surface. Since the spacer is protected by the protective film, the cleaner pressed against the ferrule end surface can be prevented from coining into contact with the surface of the spacer. As a result, it is also possible to prevent a scratch from being generated on the surface of the spacer.

[2] The optical connector of [1] may further include at least one guide hole. The at least one guide hole may be provided in the ferrule end surface. The at least one guide hole may be configured to allow a guide pin to be inserted therein. In this optical connector, the protective film may be provided in a region excluding the guide hole. In this case, it is possible to prevent the spacer from being peeled off from the ferrule end surface while more efficiently forming the protective film as compared with a case where the protective film is provided on the entire ferrule end surface and the entire surface of the spacer. For example, in a case where the protective film is formed by vapor deposition, it is possible to prevent a deposit from entering the guide hole. As a result, it is possible to prevent an increase in a force when the guide pin is removed from the guide hole.

[3] In the optical connector of [2], the at least one guide hole may be a pair of guide holes. The protective film may be provided between the pair of guide holes on the ferrule end surface. In this case, it is possible to prevent the spacer from being peeled off from the ferrule end surface while more efficiently forming the protective film as compared with a case where the protective film is provided on the entire ferrule end surface and the entire surface of the spacer.

[4] In the optical connector according to any one of [1] to [3], the protective film may be an antireflection film. In this case, the Fresnel loss generated at the tip surface of the optical fiber is prevented by the protective film. As a result, it is possible to reduce connection loss when the optical connector is connected to another optical connector.

[5] In the optical connector according to any one of [1] to [4], a hardness of the protective film may be higher than a hardness of the spacer.

In this case, it is possible to further prevent the generation of the scratch on the spacer provided on the ferrule end surface.

[6] In the optical connector according to any one of [1] to [5], a thickness of the protective film may be ¼ times or less of a thickness of the spacer. In this case, a clearance between the ferrule end surface and the other optical connector can be more reliably defined by the spacer.

[7] In the optical connector according to any one of [1] to [6], the spacer may have a frame shape including a first long side and a second long side opposing each other. The at least one optical fiber may be a plurality of optical fibers. Tip surfaces of the plurality of optical fibers may be exposed in the exposed region of the ferrule end surface between the first long side and the second long side. The protective film may be provided so as to cover the first long side, the tip surfaces of the plurality of optical fibers, and the second long side. In this case, the protective film is provided so as to cover a boundary between the exposed region of the ferrule end surface and the first long side and a boundary between the exposed region of the ferrule end surface and the second long side. This makes it possible to more reliably prevent the spacer provided on the ferrule end surface from being peeled off from the ferrule end surface.

[8] A method for manufacturing an optical connector according to an embodiment of the present disclosure includes: preparing at least one optical fiber; preparing a ferrule including at least one holding hole configured to hold the optical fiber and a ferrule end surface from which one end of the holding hole is exposed; fixing the optical fiber to the ferrule such that a tip surface of the optical fiber inserted into the holding hole is exposed at a ferrule end surface; attaching the spacer to the ferrule end surface so as to surround an exposed region where the tip surface of the optical fiber is exposed in the ferrule end surface; and forming a protective film protecting the spacer by vapor deposition. In forming the protective film, the protective film is formed so as to cover the tip surface of the optical fiber and cover at least a part of a boundary between the exposed region of the ferrule end surface and a surface of the spacer when viewed from a direction orthogonal to the ferrule end surface. Thus, it is possible to easily manufacture the optical connector capable of preventing the spacer provided on the ferrule end surface from being peeled off from the ferrule end surface.

[9] An optical connection structure according to an embodiment of the present disclosure includes: a first optical connector that is the optical connector according to any one of [1] to [7]; and a second optical connector connected to the first optical connector. In this optical connection structure, the first optical connector and the second optical connector are connected so as to oppose each other to sandwich the spacer. According to this optical connection structure, the spacer can be prevented from being peeled off from the ferrule end surface, and thus, a distance in the optical connection between the first optical connector and the second optical connector can be reliably defined by the spacer. Thus, the optical connection structure according to the embodiment can reduce connection loss in the optical connection between the first optical connector and the second optical connector.

DETAILS OF EMBODIMENTS OF PRESENT DISCLOSURE

Specific examples of the optical connector, the method for manufacturing the optical connector, and the optical connection structure according to the embodiments of the present disclosure will be described below with reference to the drawings. In the following description, the same reference signs will be used for the same elements or elements having the same functions, and the redundant description is omitted. It should be noted that the present invention is not limited to these examples, is described by the claims, and is intended to include meanings equivalent to the claims and all changes within the scope of the claims.

FIG. 1 is a cross-sectional view illustrating a configuration of the optical connection structure according to the embodiment. As illustrated in FIG. 1, an optical connection structure 100 includes an optical connector 1A (a first optical connector) and an optical connector 1B (a second optical connector). The optical connector 1A and the optical connector 1B are connected so as to oppose each other to sandwich a spacer 20. Thus, each of the optical fibers 10 held by the optical connector 1A is optically coupled to each of the optical fibers 10 held by the optical connector 1B in a state where a front end surface 12 of the optical connector 1A and the front end surface 12 of the optical connector 1B are separated from each other by a predetermined distance.

Figure 2:
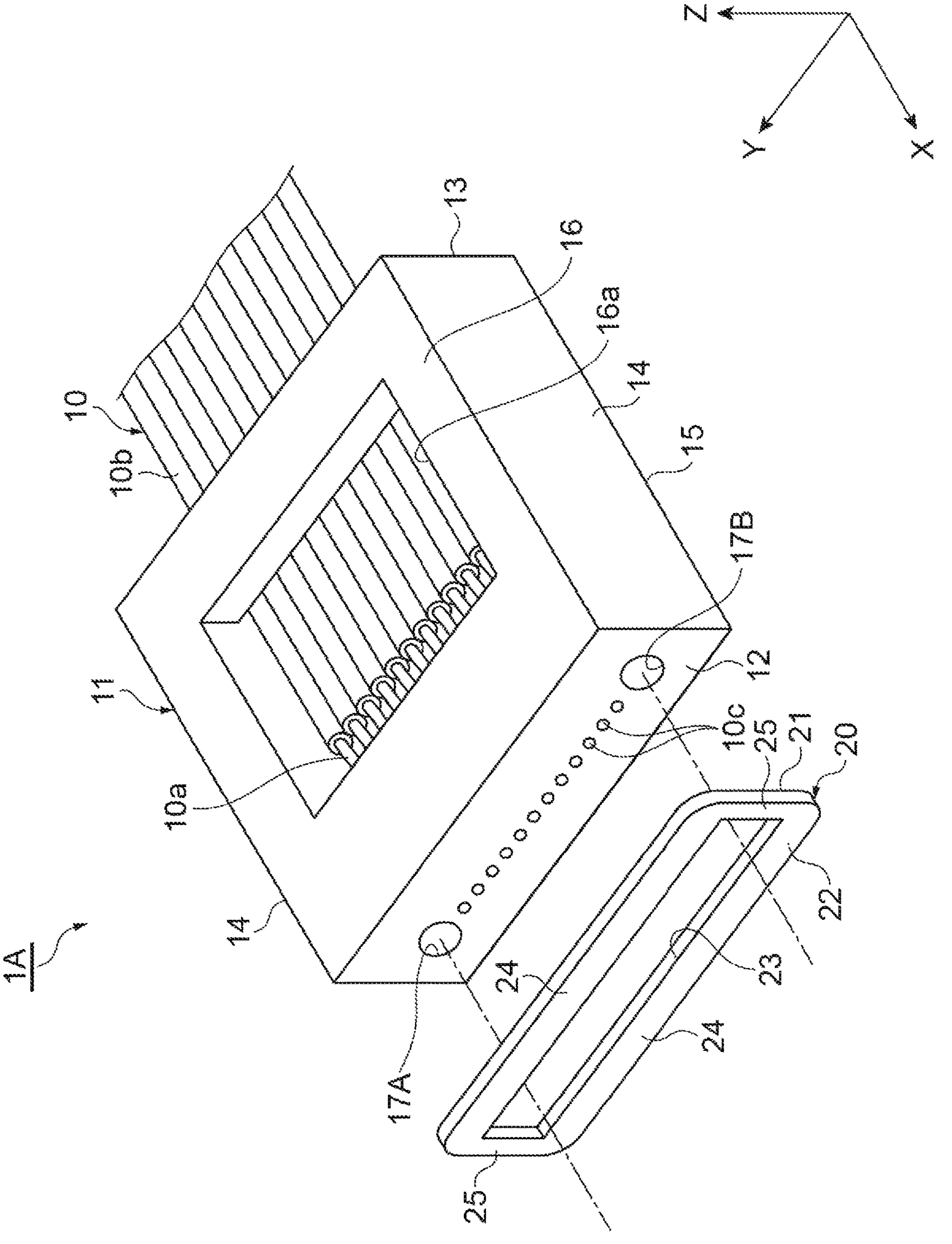
FIG. 2 is a perspective view illustrating an example of a configuration of an optical connector according to an embodiment.

FIG. 2 is a perspective view illustrating the optical connector 1A constituting one side of the optical connection structure 100. As illustrated in FIG. 2, the optical connector 1A includes a plurality of the optical fibers 10, a ferrule 11, and a spacer 20. The ferrule 11 holds the plurality of optical fibers 10. The optical connector 1A is a component that optically connects the optical fiber 10 held by the ferrule 11 to the optical fiber 10 held by the optical connector 1B constituting the other side of the optical connection structure 100. Although described in detail later, the spacer 20 adheres to the front end surface 12 (a ferrule end surface) of the optical connector 1A to define a clearance between the front end surface 12 of the optical connector 1A and the front end surface 12 of the optical connector 1B. As illustrated in FIG. 1, the optical connector 1B has the same configuration as the optical connector 1A except that the spacer 20 is not provided. The optical connector 1B includes the plurality of optical fibers 10 and the ferrule 11. Hereinafter, the optical fiber 10 and the ferrule 11 will be described as constituent members of the optical connectors 1A and 1B unless otherwise specified. In the optical connection structure illustrated in FIG. 1, the optical connector 1B is connected to the optical connector 1A in a vertically inverted state from the optical connector 1A.

Each of the optical fibers 10 extends along the X direction. The plurality of optical fibers 10 are arranged side by side in the Y direction inside the ferrule 11. Each of the optical fibers 10 has a bare optical fiber 10*a* and a resin coating 10*b*. The resin coating 10*b* covers the bare optical fiber 10*a*. In each of the optical fibers 10, the bare optical fiber 10*a* is exposed by removing the resin coating 10*b* from the middle in the X direction to a tip surface 10*c*. The number of the optical fibers 10 is not limited to 12 as in the example illustrated in FIG. 2. The number of the optical fibers 10 may be 4, 8, 24, or the like.

The ferrule 11 is a member that aligns and holds the plurality of optical fibers 10. The ferrule 11 has, for example, a substantially rectangular parallelepiped appearance. The ferrule 11 is made of, for example, a resin. The ferrule 11 is made of a polyphenylene sulfide (PPS) resin containing an inorganic filler such as carbon as an example. The ferrule 11 has the front end surface 12 and a rear end surface 13. The front end surface 12 is located at a front end in the X direction. The rear end surface 13 is located at a rear end in the X direction. The ferrule 11 has a pair of side surfaces 14, a bottom surface 15, and an upper surface 16. The pair of side surfaces 14 is provided so as to oppose each other in the Y direction. The bottom surface 15 and the upper surface 16 are provided so as to oppose each other in the Z direction. The upper surface 16 is provided with a window portion 16*a*.

The front end surface 12 is located at the front end of the ferrule 11 in the X direction. The front end surface 12 is, for example, a flat surface. As illustrated in FIG. 1, the front end surface 12 is inclined with respect to the YZ plane. An inclination angle θ formed by the front end surface 12 and the YZ plane is, for example, 4° or more and 16° or less, and is 8° as an example (see FIG. 4). The front end surface 12 is not necessarily inclined. The front end surface 12 has a central region R1 (the exposed region) at the center in the Y direction and the Z direction (see FIG. 3). In the central region R1, the tip surfaces 10*c* of the plurality of optical fibers 10 are exposed. In other words, each of holding holes 19 provided in the ferrule 11 is opened in the central region R1 of the front end surface 12. Openings of the holding holes 19 are formed in a row along the Y direction. A pair of guide holes 17A and 17B is further opened in the central region R1. The pair of guide holes 17A and 17B is provided so as to sandwich the tip surfaces 10*c* of the plurality of optical fibers 10 in the Y direction.

The rear end surface 13 is located at the rear end of the ferrule 11 in the X direction. The rear end surface 13 extends along the YZ plane. An introduction hole 18 for collectively receiving the plurality of optical fibers 10 is formed in the rear end surface 13. The introduction hole 18 is connected to the outside of the ferrule 11 through the window portion 16*a*. A plurality of the holding holes 19 are formed so as to penetrate from a front portion of the introduction hole 18 to the front end surface 12 (see FIG. 1 and FIG. 3). Each of the bare optical fiber 10*a* is inserted into and held in each of the holding holes 19. Each of the tip surfaces 10*c* is exposed from the front end surface 12 as described above. Each of the tip surfaces 10*c* is, for example, flush with the front end surface 12. The tip surface 10*c* of the optical connector 1A is optically coupled to the tip surface 10*c* of the optical connector 1B (see FIG. 1). That is, light emitted from the tip surface 10*c* of the optical connector 1A passes through an optical path L and is incident on the tip surface 10*c* of the optical connector 1B. Similarly, light emitted from the tip surface 10*c* of the optical connector 1B passes through the optical path L and is incident on the tip surface 10*c* of the optical connector 1A.

The pair of guide holes 17A and 17B is configured to position the optical fibers 10 corresponding to each other together with guide pins (not illustrated) on surfaces along the YZ plane when the optical connector 1A and the optical connector 1B are connected. The pair of guide holes 17A and 17B extends from the front end surface 12 toward the rear end surface 13. The pair of guide holes 17A and 17B is configured to allow the guide pins to be inserted therein. For example, the optical fibers 10 corresponding each other are positioned by inserting half of each of the guide pins into each of the pair of guide holes 17A and 17B of the optical connector 1A and inserting the remaining half of the guide pin into each of the pair of guide holes 17A and 17B of the optical connector 1B.

The spacer 20 is a thin member configured to define the clearance between the front end surface 12 of the optical connector 1A and the front end surface 12 of the optical connector 1B. The spacer 20 has a first main surface 21 and a second main surface 22. The second main surface 22 is located on a side opposite to the first main surface 21. The first main surface 21 adheres to the front end surface 12 of the optical connector 1A. The second main surface 22 abuts on the front end surface 12 of the optical connector 1B when the optical connector 1A is connected to the optical connector 1B. The spacer 20 is made of, for example, a film-shaped resin member. The spacer 20 can be made of a polyphenylene sulfide (PPS) resin film as an example. A thickness T (see FIG. 4) of the spacer 20 may be, for example, 5 μm or more and 100 μm or less, 5 μm or more and 25 μm or less, or 8 μm as an example. Here, the adhesion may be not only adhesion using an adhesive but also mechanical adhesion, chemical adhesion, dispersion adhesion, electrostatic adhesion, welding, or the like. In a case where the resin forming the spacer 20 is the same type (for example, the PPS resin) as the base resin constituting the ferrule 11, the spacer 20 can easily adhere to the front end surface 12 of the ferrule 11 by welding or the like.

The spacer 20 extends (adheres) along the outer periphery of the front end surface 12 and has a frame shape, for example. An opening 23 is formed on the inner side of the spacer 20. The opening 23 is configured to allow the light emitted from the tip surface 10*c* of the optical fiber 10 to pass therethrough. The spacer 20 has a pair of long sides 24 and a pair of short sides 25. The pair of long sides 24 extends along the Y direction. The pair of short sides 25 extends along the Z direction. The spacer 20 surrounds the central region R1 of the front end surface 12 by the pair of long sides 24 and the pair of short sides 25 (see FIG. 3). The opening 23 allows a plurality of the optical paths L extending between the tip surfaces 10*c* of the plurality of optical fibers 10 of the optical connector 1A and the tip surfaces 10*c* of the plurality of optical fibers 10 of the optical connector 1B to pass therethrough (see FIGS. 1 and 2). The opening 23 may be configured to allow the guide pins, inserted into and removed from the pair of guide holes 17A and 17B, to pass therethrough. With such a spacer 20, the optical fibers 10 of the optical connector 1A and the optical fibers 10 of the optical connector 1B can be optically connected in a non-contact manner.

Figure 3:
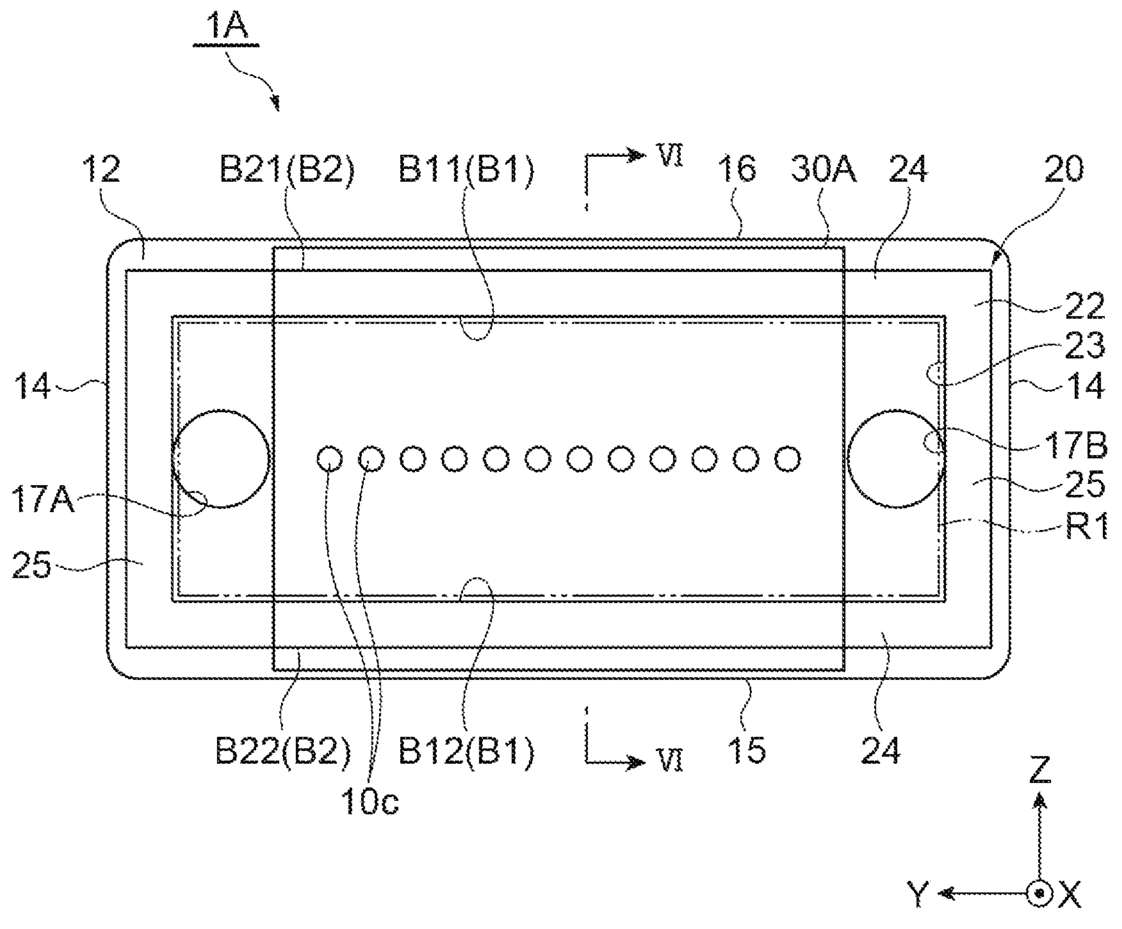
FIG. 3 is a front view illustrating a ferrule end surface of the optical connector.
Figure 4:
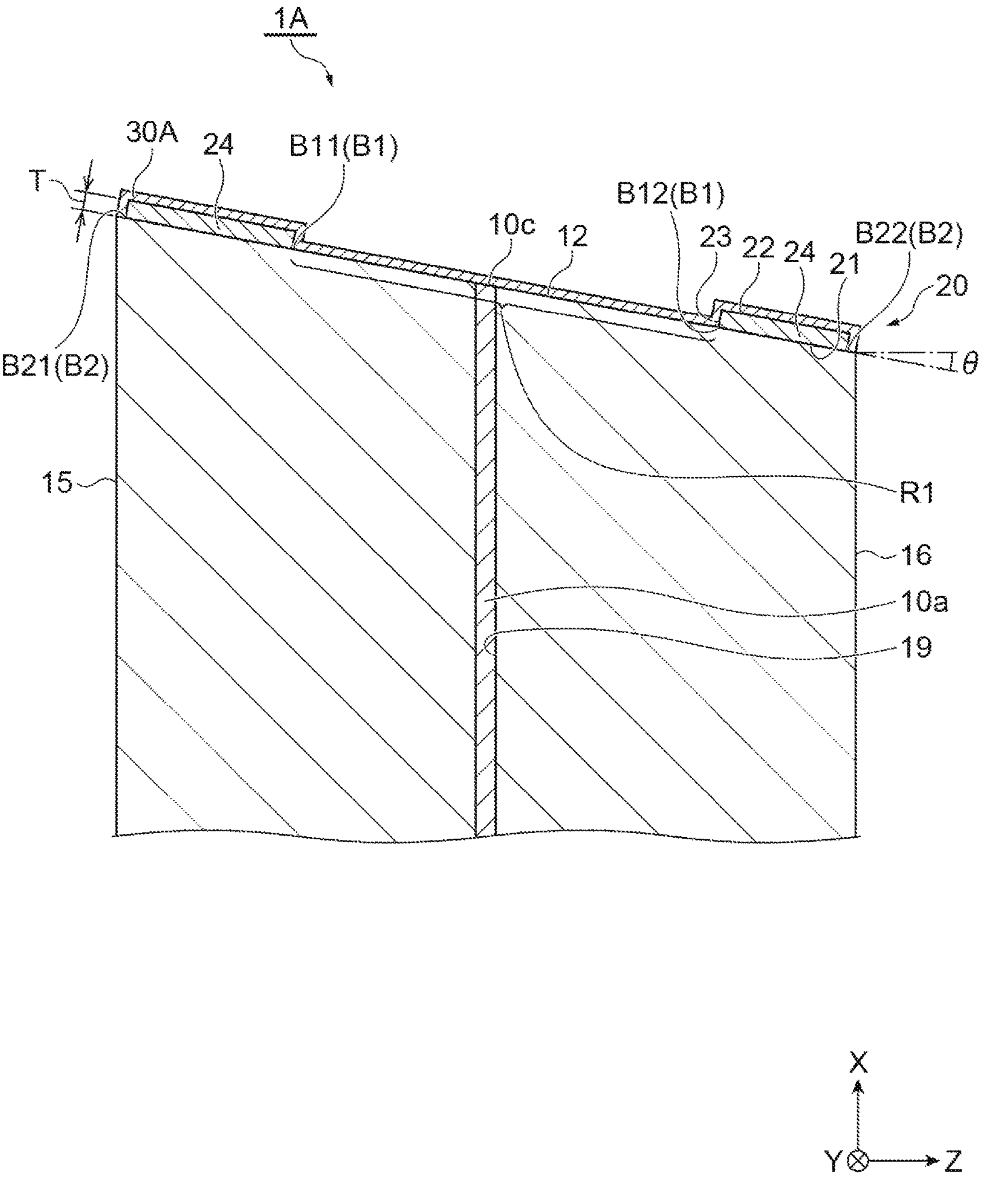
FIG. 4 is a view illustrating an example of a cross-sectional structure of the optical connector taken along line VI-VI of FIG. 3.

As illustrated in FIGS. 3 and 4, the optical connector 1A having the above-described configuration further includes a protective film 30A. FIG. 3 is a front view illustrating the front end surface 12 of the optical connector 1A. FIG. 4 is a view illustrating an example of a cross-sectional structure of the optical connector 1A taken along line VI-VI of FIG. 3. The protective film 30A is a film that protects the tip surfaces 10*c* of the plurality of optical fibers 10 held by the optical connector 1A and the spacer 20. The protective film 30A is provided from the central region R1 of the front end surface 12 to the second main surface 22 of the spacer 20. Specifically, the protective film 30A is formed so as to continuously cover the tip surfaces 10*c* of the plurality of optical fibers 10 arranged in a line along the Y direction and the pair of long sides 24 (a first long side and a second long side) of the spacer 20. With this configuration, when viewed from a direction orthogonal to the front end surface 12, the protective film 30A covers boundaries B1 and B2 between the front end surface 12 and the second main surface 22 of the spacer 20 (long side 24) to protect the boundaries B1 and B2. The protective film 30A is provided so as to exclude a region where the pair of guide holes 17A and 17B is located in the central region R1. For example, the protective film 30A is provided between the pair of guide holes 17A and 17B in the central region R1 of the front end surface 12. Thus, the insertion of the guide pins into the pair of guide holes 17A and 17B is not hindered.

In the example illustrated in FIGS. 3 and 4, the protective film 30A has a rectangular shape when viewed from the direction orthogonal to the front end surface 12. When viewed from the direction orthogonal to the front end surface 12, the protective film 30A extends from an end portion closer to the bottom surface 15 of the ferrule 11 to an end portion closer to the upper surface 16 in the front end surface 12. The protective film 30A covers a part of the spacer 20 provided between the pair of guide holes 17A and 17B when viewed from the Z direction.

The boundary B1 between the central region R1 of the front end surface 12 and the second main surface 22 of the long side 24 of the spacer 20 includes a boundary B11 and a boundary B12. The boundary B11 extends along the Y direction near the upper surface 16 on the front end surface 12. The boundary B12 extends along the Y direction near the bottom surface 15 on the front end surface 12. The protective film 30A covers the boundaries B11 and B12 when viewed from the direction orthogonal to the front end surface 12. The boundary B2 between an outer edge of the front end surface 12 and the second main surface 22 of the long side 24 of the spacer 20 includes a boundary B21 and a boundary B22. The boundary B21 extends along the Y direction near the upper surface 16 on the front end surface 12. The boundary B22 extends along the Y direction near the bottom surface 15 on the front end surface 12. The protective film 30A may further cover the boundaries B21 and B22 when viewed from the direction orthogonal to the front end surface 12.

Figure 5:
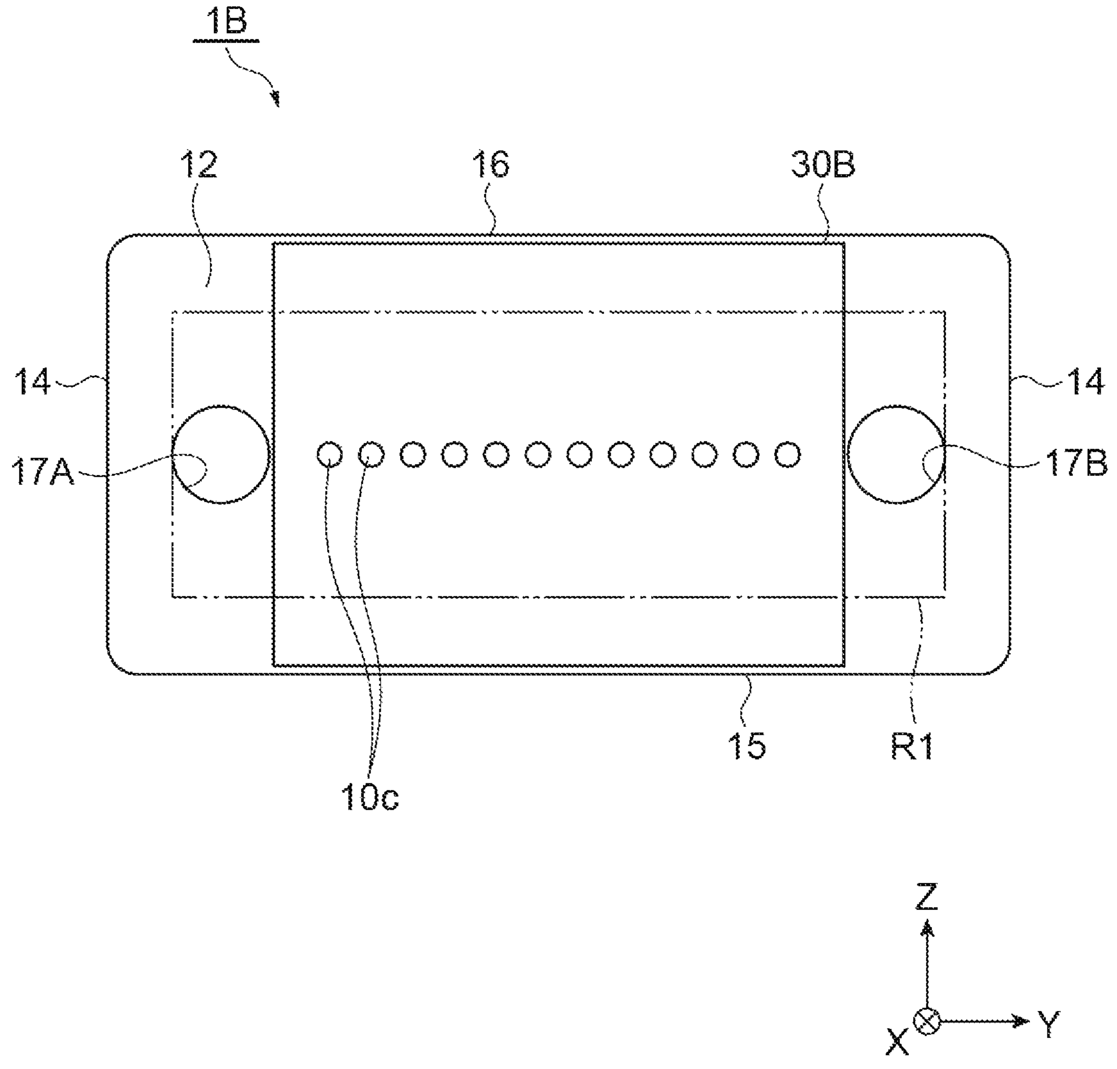
FIG. 5 is a front view illustrating a ferrule end surface of another optical connector.

The optical connector 1B may further include a protective film 30B corresponding to the protective film 30A. FIG. 5 is a front view illustrating the front end surface 12 of the optical connector 1B. As illustrated in FIG. 5, the protective film 30B is provided on the front end surface 12 of the optical connector 1B. The protective film 30B covers the tip surfaces 10*c* of the plurality of optical fibers 10, which is similar to the protective film 30A. The protective film 30B is provided in a region excluding the guide holes 17A and 17B in the central region R1, which is similar to the protective film 30A. In the example illustrated in FIG. 5, the protective film 30B has a rectangular shape when viewed from a direction orthogonal to the front end surface 12. When viewed from the direction orthogonal to the front end surface 12, the protective film 30B extends from an end portion closer to the bottom surface 15 of the ferrule 11 to an end portion closer to the upper surface 16 in the front end surface 12. Since the optical connector 1B does not include the spacer 20, the protective film 30B does not have a configuration for covering the spacer 20, which is different from the protective film 30A.

Each of the protective films 30A and 30B is, for example, an antireflection film (AR coating), and is, for example, a deposited film in which a multilayer oxide film is layered. The protective films 30A and 30B prevent reflection caused by a difference in refractive index between the optical fiber 10 and air, thereby preventing optical loss. Each of the protective films 30A and 30B is a film in which a film having a high refractive index and a film having a low refractive index are alternately layered. For example, a film made of a material much harder than the resin is formed on the surface of each of the protective films 30A and 30B. For example, a film made of quartz is formed on the surface of the protective film 30A. A hardness of each of the protective films 30A and 30B is higher than that of the spacer 20. A thickness of each of the protective films 30A and 30B in the direction orthogonal to the front end surface 12 is, for example, ¼ times or less of a thickness of the spacer 20. The thicknesses of the protective films 30A and 30B are, for example, less than 1 μm. Thus, the definition of the clearance by the spacer 20 is not hindered.

Figure 6:
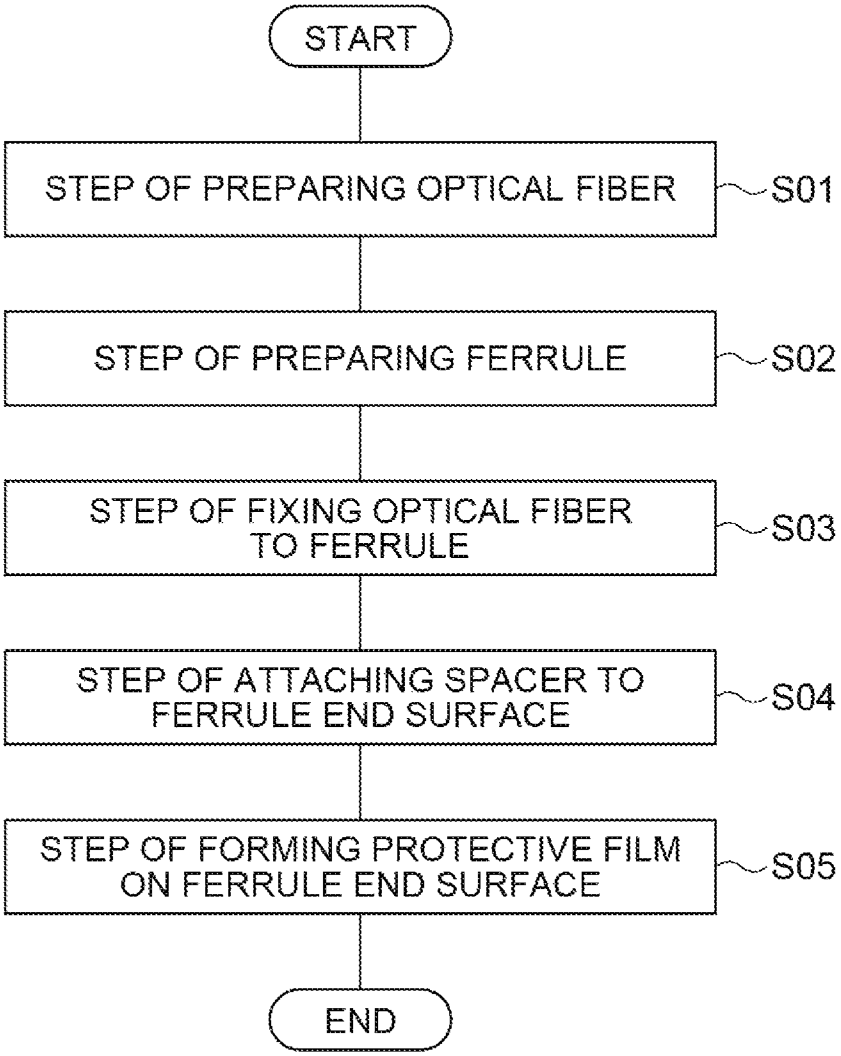
FIG. 6 is a flowchart illustrating an example of a method for manufacturing an optical connector according to an embodiment.

Next, an example of a method for manufacturing the optical connector 1A having the above-described configuration will be described with reference to FIG. 6. FIG. 6 is a flowchart for describing the method for manufacturing the optical connector 1A. In the method for manufacturing the optical connector 1A, first, the plurality of optical fibers 10 are prepared (Step S01: Step of preparing optical fiber). Specifically, the plurality of optical fibers 10 each having the bare optical fiber 10*a* and the resin coating 10*b* covering the bare optical fiber 10*a* are prepared. Then, the resin coating 10*b* from the tip surface 10*c* to a predetermined position is removed in each of the optical fibers 10. Thus, the bare optical fibers 10*a* are exposed.

Subsequently, the ferrule 11 is prepared (Step S02: Step of preparing ferrule). As the ferrule 11 having the flat front end surface 12, for example, one manufactured by extrusion molding or the like is prepared. The ferrule 11 is an MT ferrule as an example.

Subsequently, the plurality of optical fibers 10 are fixed to a predetermined location inside the ferrule 11 (Step S03:

Step of fixing optical fiber to ferrule). Specifically, the plurality of optical fibers 10 are inserted into the ferrule 11 from the introduction hole 18 of the ferrule 11, and the bare optical fibers 10*a* of the respective optical fibers 10 are inserted into the corresponding holding holes 19. Then, the optical fibers 10 are moved to a position where the tip surfaces 10*c* of the respective optical fibers 10 are exposed from the central region R1 of the front end surface 12. The tip surfaces 10*c* may be flush with the front end surface 12. Thereafter, an adhesive is injected into the introduction hole 18 from the window portion 16*a* of the ferrule 11. At this time, the injected adhesive covers the optical fibers 10 held by a holding mechanism (not illustrated) of the ferrule 11. Thereafter, the adhesive is cured to fix the plurality of optical fibers 10 to the ferrule 11.

Subsequently, the spacer 20 is attached to the front end surface 12 (Step S04: Step of attaching spacer to ferrule end surface). Specifically, the frame-shaped spacer 20 is attached to the front end surface 12 so as to surround the central region R1 of the front end surface 12. More specifically, the spacer 20 is attached to the front end surface 12 such that the spacer 20 surrounds the central region R1 of the front end surface 12 and the opening 23 of the spacer 20 is located in the central region R1. For the attachment of the spacer 20, various methods such as welding can be used. Thus, the tip surfaces 10*c* of the optical fibers 10 and the pair of guide holes 17A and 17B are located in the opening 23 of the spacer 20 (see also FIG. 3).

Subsequently, the protective film 30A is formed on the front end surface 12 (Step 505: Step of forming protective film on ferrule end surface). Specifically, the protective film 30A is formed by vapor deposition so as to cover the central region R1 of the front end surface 12 and the pair of long sides 24 of the spacer 20. More specifically, the protective film 30A is formed by vapor deposition such that the protective film 30A covers the tip surfaces 10*c* of the plurality of optical fibers 10 and covers the boundaries B1 and B2 between the front end surface 12 and the long side 24 of the spacer 20 when viewed from the Z direction (see also FIG. 3). At the time of vapor deposition, the front end surface 12 of the optical connector 1A is covered with a mask covering regions corresponding to the short sides 25 of the spacer 20 and the guide holes 17A and 17B, and vapor deposition processing is performed. This prevents a deposition material from entering the guide holes 17A and 17B. In a case where the protective film 30A is formed of a multilayer film, such vapor deposition processing is repeated. The optical connector 1A is manufactured as described above. A method for manufacturing the optical connector 1B is similar to that of the optical connector 1A except for the step of attaching the spacer 20, and thus, the description thereof is omitted.

Hereinafter, operational effects of the optical connector 1A, the optical connection structure 100, and the method for manufacturing the optical connector 1A according to the embodiments will be described. In an optical connector of the related art, when the optical connector is connected to another optical connector, a cleaner such as cloth is slid in a state of being strongly pressed against a ferrule end surface prior to the connection, thereby cleaning a tip surface of an optical fiber exposed from the ferrule end surface. This makes it possible to prevent optical connection loss caused by adhesion of foreign matter onto the tip surface of the optical fiber. However, the optical connector of the related art has a configuration in which a frame-shaped spacer made of a thin film adheres to the ferrule end surface, and the tip surface of the optical fiber is cleaned in a narrow region on the inner side of the spacer. Therefore, when the tip surface of the optical fiber is cleaned, the cleaner sometimes comes into contact with the spacer located around the region where the tip surface of the optical fiber is exposed so that the spacer is peeled off from the ferrule end surface.

For example, the cleaner used for cleaning the tip surface of the optical fiber is generally dry. In this case, when the tip surface of the optical fiber is cleaned, the cleaner is pressed against a front end surface of the optical connector, and the cleaner slides with respect to the front end surface of the optical connector Thus, foreign matter on the tip surface of the optical fiber is removed. Here, in order to reliably remove the foreign matter on the tip surface of the optical fiber, it is necessary to slide the cleaner by pressing the cleaner against the front end surface of the optical connector including the tip surface of the optical fiber with a certain force or more. Therefore, the force is applied in a direction parallel to the front end surface of the optical connector, and friction occurs between the front end surface of the optical connector and the cleaner. As a result, the cloth is caught at a boundary between the front end surface of the ferrule and the surface of the spacer, so that there is a possibility that the spacer is peeled off from the front end surface of the ferrule. There is a possibility that the film is damaged since the spacer on the front end surface of the ferrule and the cleaner come into contact with each other.

On the other hand, in the optical connector 1A according to the embodiment, the protective film 30A is provided so as to cover at least a part of the boundary B1 between the front end surface 12 and the second main surface 22 of the spacer 20 when viewed from the direction orthogonal to the front end surface 12. Thus, when the tip surfaces 10*c* of the optical fibers 10 are cleaned, it is possible to prevent a cleaner pressed against the front end surface 12 from coining into contact with the boundary B1 between the central region R1 of the front end surface 12 and the surface of the spacer 20. As a result, it is possible to prevent the spacer 20 provided on the front end surface 12 from being peeled off from the front end surface 12. Since the spacer 20 is protected by the protective film 30A, the cleaner pressed against the front end surface 12 can be prevented from coining into contact with the surface of the spacer 20. As a result, it is also possible to prevent a scratch from being generated on the surface of the spacer 20.

For example, when the tip surfaces 10*c* of the optical fibers 10 are cleaned, if the front end surface 12 is pushed into the cleaner, cloth of the cleaner is wound, so that the cloth slides in a certain orientation along the Z direction with respect to the front end surface 12. The cloth slides in the certain orientation while entering the inner side of the opening 23 of the spacer 20 between the pair of guide holes 17A and 17B. The protective film 30A prevents the cleaner pressed against the front end surface 12 from coining into contact with the boundary B1 between the spacer 20 and the front end surface 12. For example, when the cloth slides from the bottom surface 15 toward the upper surface 16 in the Z direction, the protective film 30A prevents the cloth from coining into contact with the boundary B11 between the front end surface 12 and the second main surface 22 of the spacer 20. For example, when the cloth slides in an orientation opposite to the above-described orientation, the protective film 30A prevents the cloth from coining into contact with the boundary B12 between the front end surface 12 and the second main surface 22 of the spacer 20. In any of the above cases, since the cloth or the like is prevented from coining into contact with an inner edge of the spacer 20 provided on the front end surface 12, the spacer 20 is prevented from being turned up. As a result, it is possible to prevent the spacer 20 from being peeled off the front end surface 12.

The optical connector 1A according to the embodiment includes at least one of the pair of guide holes 17A and 17B provided in the front end surface 12 and configured to receive the insertion of the guide pin. In the optical connector 1A, the protective film 30A is provided in the region excluding the pair of guide holes 17A and 17B in the central region R1. In this case, it is possible to prevent the spacer 20 from being peeled off from the front end surface 12 while more efficiently forming the protective film 30A as compared with a case where the protective film 30A is provided on the entire front end surface 12 and the entire second main surface 22 of the spacer 20.

Figure 7:
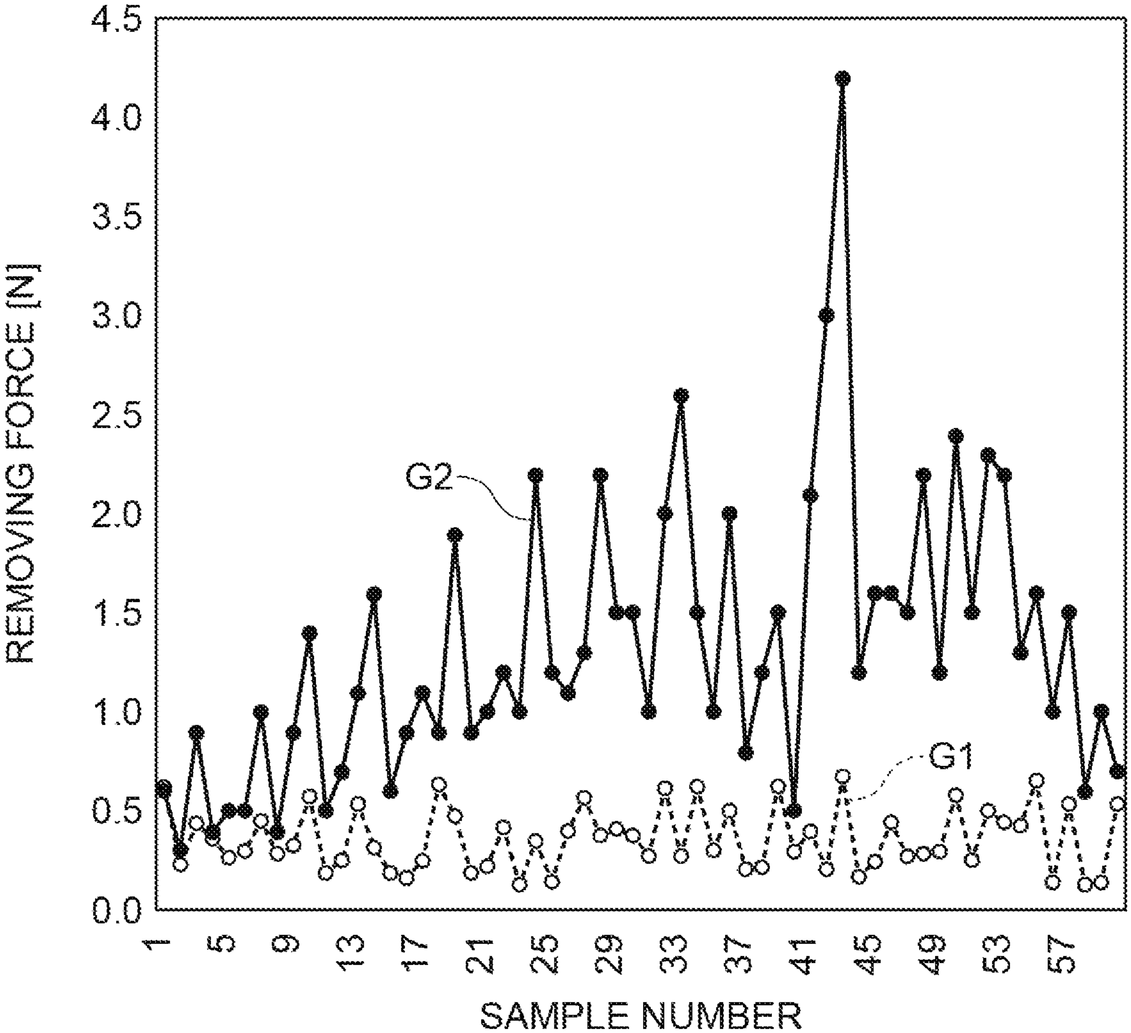
FIG. 7 is a graph for describing an action and an effect exhibited by the optical connector according to the embodiment.

Here, when the protective film 30A is formed on the entire front end surface 12 and the entire second main surface 22 of the spacer 20 by vapor deposition, deposits enter the pair of guide holes 17A and 17B. Thus, a removing force when the guide pins are inserted into and removed from the pair of guide holes 17A and 17B increases. FIG. 7 is a graph G1 showing the above-described removing force before formation of the protective film 30A and a graph G2 showing the above-described removing force after formation of the protective film 30A. In FIG. 7, the horizontal axis represents a sample number, and the vertical axis represents the removing force (N). As illustrated in FIG. 7, when the protective film 30A is formed on the entire front end surface 12 and the entire second main surface 22 of the spacer 20 by vapor deposition, the removing force when the guide pins are inserted into and removed from the pair of guide holes 17A and 17B increases.

On the other hand, in the optical connector 1A according to the embodiment, the protective film 30A is provided in the region excluding the pair of guide holes 17A and 17B. Thus, for example, even when the protective film 30A is formed by vapor deposition, it is possible to prevent deposits from entering the guide holes. As a result, it is possible to prevent an increase in a force when the guide pin is removed from the guide hole. Since a range in which the protective film 30A is formed is partially limited as described above, it is possible to prevent the increase in the removing force when the guide pins are inserted into and extracted from the pair of guide holes 17A and 17B while preventing damage of the spacer 20 by the cleaner at the time of cleaning the tip surfaces 10*c* of the optical fibers 10 on the front end surface 12.

The optical connector 1A according to the embodiment includes the pair of guide holes 17A and 17B into which the guide pins are inserted. The protective film 30A is provided between the pair of guide holes 17A and 17B on the front end surface 12. In this case, the protective film 30A can be formed more efficiently as compared with the case where the protective film 30A is provided on the entire front end surface 12 and the entire second main surface 22 of the spacer 20. Further, the cleaner has, for example, a structure for cleaning only a portion between the pair of guide holes 17A and 17B. Thus, even when the protective film 30A is deposited only between the pair of guide holes 17A and 17B instead of the entire front end surface 12, it is possible to prevent the spacer 20 from being peeled off from the front end surface 12 and to prevent a scratch from being generated on the second main surface 22 of the spacer 20.

In the optical connector 1A according to the embodiment, the protective film 30A is an antireflection film. In this case, the Fresnel loss generated at the tip surface 10*c* of the optical fiber 10 is prevented by the protective film 30A. As a result, it is possible to reduce the connection loss when the optical connector 1A is connected to the optical connector 1B.

In the optical connector 1A according to the embodiment, the hardness of the protective film 30A is higher than the hardness of the spacer 20. In this case, it is possible to further prevent the generation of the scratch on the spacer 20 provided on the front end surface 12.

In the optical connector 1A according to the embodiment, the thickness of the protective film 30A may be ¼ times or less of the thickness of the spacer 20. In this case, the clearance between the front end surface 12 and the optical connector 1B can be more reliably defined by the spacer 20.

In the optical connector 1A according to the embodiment, the spacer 20 has the frame shape including the pair of long sides 24 opposing each other. Each of the tip surfaces 10*c* of the plurality of optical fibers 10 is exposed in the central region R1 of the front end surface 12 between the pair of long sides 24. The protective film 30A is provided so as to cover the pair of long sides 24 and the tip surfaces 10*c* of the plurality of optical fibers 10. In this case, the protective film 30A is provided so as to cover the boundary B1 between the central region R1 of the front end surface 12 and the long side 24. This makes it possible to more reliably prevent the spacer 20 provided on the front end surface 12 from being peeled off from the front end surface 12.

The method for manufacturing the optical connector 1A according to the embodiment includes: a step of preparing the optical fiber 10; a step of preparing the ferrule 11 having the holding hole 19 configured to hold the optical fiber 10 and the front end surface 12 from which one end of the holding hole 19 is exposed; a step of fixing the optical fiber 10 to the ferrule 11 such that the tip surface 10*c* of the optical fiber 10 inserted into the holding hole 19 is exposed at the front end surface 12; a step of attaching the spacer 20 to the front end surface 12 so as to surround the central region R1 of the front end surface 12 where the tip surface 10*c* of the optical fiber 10 is exposed; and a step of forming the protective film 30A for protecting the spacer 20 by vapor deposition. In the step of forming the protective film 30A, the protective film 30A is formed so as to cover the tip surface 10*c* of the optical fiber 10 and cover at least a part of the boundary B1 between the central region R1 of the front end surface 12 and the surface of the spacer 20 when viewed from the direction orthogonal to the front end surface 12. Thus, it is possible to manufacture the optical connector 1A capable of preventing the spacer 20 provided on the front end surface 12 from being peeled off from the front end surface 12.

The optical connection structure 100 according to the embodiment includes the optical connector 1A and the optical connector 1B connected to the optical connector 1A. In the optical connection structure 100, the optical connector 1A and the optical connector 1B are connected so as to oppose each other to sandwich the spacer 20. According to the optical connection structure 100, the spacer 20 can be prevented from being peeled off from the front end surface 12, and thus, a distance in optical connection between the optical connector 1A and the optical connector 1B can be reliably defined by the spacer 20. Thus, according to the optical connection structure 100, the connection loss in the optical connection between the optical connector 1A and the optical connector 1B can be reduced.

Although the optical connector, the method for manufacturing the optical connector, and the optical connection structure according to the present disclosure have been described in detail above, the present invention is not limited to the above embodiments, and can be applied to various embodiments and modifications.

Figure 8:
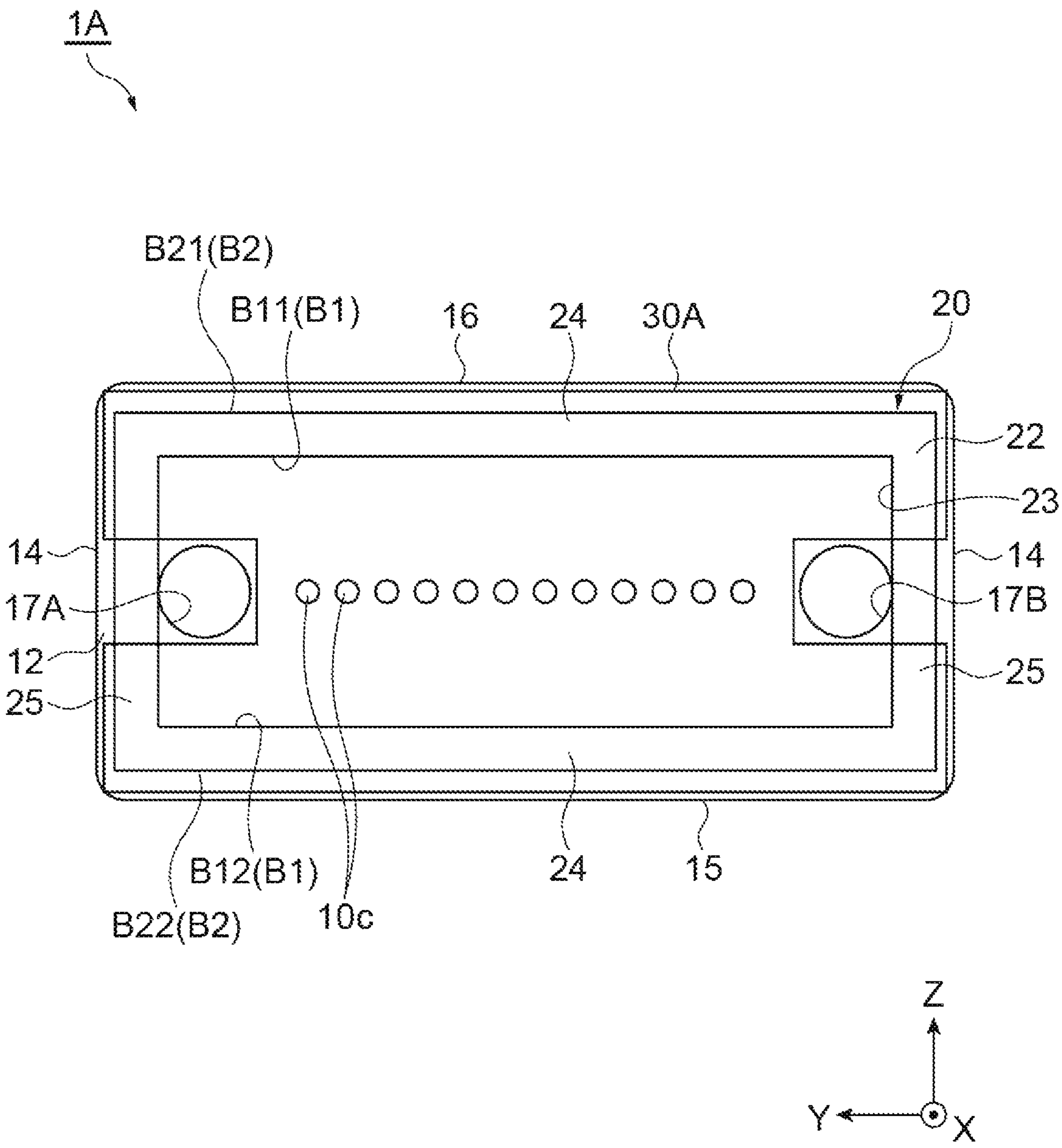
FIG. 8 is a front view illustrating a ferrule end surface of an optical connector according to a modification.

Although the protective film 30A is provided between the pair of guide holes 17A and 17B when viewed from the Z direction in the above embodiments, the present invention is not limited thereto. The protective film 30A may cover any one of the boundary B11 and the boundary B12 between the front end surface 12 and the second main surface 22 of the spacer 20. The protective film 30A may be provided in a region excluding the pair of guide holes 17A and 17B. For example, as illustrated in FIG. 8, the protective film 30A may be formed in a region excluding the pair of guide holes 17A and 17B and the short sides 25 of the spacer 20. In this case, the protective film 30A may be formed by vapor deposition by covering the front end surface 12 of the optical connector 1A with a mask that covers regions corresponding the short sides 25 of the spacer 20 and the guide holes 17A and 17B. The protective film 30A may be formed by vapor deposition in a state where a guide pin or a pin having the same diameter as the guide pin is inserted into each of the pair of guide holes 17A and 17B. In this case, the pins inserted into the pair of guide holes 17A and 17B may be substantially flush with the front end surface 12 (at about the same height as the front end surface 12). Thus, a deposit is prevented from being interrupted by the pins excessively protruding from the front end surface 12.

Although the protective film 30A extends from the end portion closer to the bottom surface 15 to the end portion of the ferrule 11 closer to the upper surface 16 in the front end surface 12 when viewed from the direction orthogonal to the front end surface 12 in the above embodiments, the present invention is not limited thereto. The protective film 30A may cover any one of the boundary B11 and the boundary B12 between the front end surface 12 and the second main surface 22 of the spacer 20. For example, the protective film 30A does not necessarily cover the boundary B21 and the boundary B22 between the front end surface 12 and the second main surface 22 of the spacer 20.

Although the pair of guide holes 17A and 17B is provided in the above embodiment, only the guide hole 17A or the guide hole 17B may be provided in the front end surface 12, or the present disclosure may be applied to a ferrule having no guide hole.

What is claimed is:

1. An optical connector comprising:
at least one optical fiber;
a ferrule including a ferrule end surface and configured to hold the optical fiber to expose a tip surface of the optical fiber at the ferrule end surface;
a spacer provided on the ferrule end surface and surrounding an exposed region where the tip surface of the optical fiber is exposed in the ferrule end surface; and
a protective film configured to protect the spacer,
wherein the spacer has a first surface that is in direct contact with the ferrule end surface and a second surface, opposite the first surface, that is in direct contact with the protective film, and the protective film is provided to cover the tip surface of the optical fiber and cover at least a part of a boundary between the exposed region of the ferrule end surface and the second surface of the spacer as viewed from a direction orthogonal to the ferrule end surface.

2. The optical connector according to claim 1, further comprising
at least one guide hole provided in the ferrule end surface and configured to receive insertion of a guide pin,
wherein the protective film is provided in a region excluding the guide hole.

3. The optical connector according to claim 2, wherein
the at least one guide hole is a pair of guide holes, and
the protective film is provided between the pair of guide holes on the ferrule end surface.

4. The optical connector according to claim 1, wherein
the protective film is an antireflection film.

5. The optical connector according to claim 1, wherein
a hardness of the protective film is higher than a hardness of the spacer.

6. The optical connector according to claim 1, wherein
a thickness of the protective film is ¼ times or less of a thickness of the spacer.

7. The optical connector according to claim 1, wherein
the spacer has a frame shape including a first long side and a second long side opposing each other,
the at least one optical fiber is a plurality of optical fibers,
tip surfaces of the plurality of optical fibers are exposed in the exposed region of the ferrule end surface between the first long side and the second long side, and
the protective film is provided to cover the first long side, the tip surfaces of the plurality of optical fibers, and the second long side.

8. An optical connection structure comprising:
a first optical connector being the optical connector according to claim 1; and
a second optical connector connected to the first optical connector,
wherein the first optical connector and the second optical connector are connected to oppose each other to sandwich the spacer.

9. A method for manufacturing an optical connector, the method comprising:
preparing at least one optical fiber;
preparing a ferrule including at least one holding hole configured to hold the optical fiber and a ferrule end surface from which one end of the holding hole is exposed;
fixing the optical fiber to the ferrule so that a tip surface of the optical fiber inserted into the holding hole is exposed at the ferrule end surface;
attaching a spacer to the ferrule end surface so that a first surface of the spacer is in direct contact with the ferrule end surface, the spacer surrounding an exposed region where the tip surface of the optical fiber is exposed in the ferrule end surface; and
forming a protective film configured to protect the spacer by vapor deposition so that the protective film directly contacts a second surface of the spacer that is opposite the first surface;
wherein, in the forming the protective film, the protective film is formed to cover the tip surface of the optical fiber and cover at least a part of a boundary between the exposed region of the ferrule end surface and the second surface of the spacer when the protective film is viewed from a direction orthogonal to the ferrule end surface.

* * * * *